United States Patent Office 3,202,663
Patented Aug. 24, 1965

3,202,663
RING E SUBSTITUTED YOHIMBANES
Jay Donald Albright and Leon Goldman, Nanuet, N.Y., assignors to American Cyanamid Company, Stamford, Conn., a corporation of Maine
No Drawing. Continuation of application Ser. No. 192,984, May 7, 1962. This application Aug. 12, 1963, Ser. No. 301,617
2 Claims. (Cl. 260—288)

This application is a continuation of our copending application Serial No. 192,984, filed May 7, 1962, now abandoned.

This invention relates to new organic compounds and more particularly, is concerned with novel ring E substituted derivatives of yohimbe alkaloids which may be represented by the following general formula:

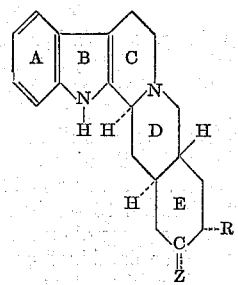

wherein C====Z is selected from the group consisting of C====O,

and

and R is selected from the group consisting of cyano and lower carboalkoxy; with the proviso that when C====Z is C====O then R is cyano. Suitable lower carboalkoxy groups contemplated by the present invention are those having from two to six carbon atoms such as carbomethoxy, carbethoxy, and the like. The invention also embraces the useful non-toxic pharmaceutically acceptable acid-addition salts of these new derivatives. Typical acid-addition salts are the hydrochlorides, phosphates, sulfates, citrates, etc.

The novel compounds of the present invention are, in general, white crystalline solids, the free bases of which are soluble in organic solvents such as lower alkanols, chloroform, acetone, ethyl acetate, dimethylformamide, and the like; and the salts of which are soluble in polar solvents such as water and lower alkanols.

The novel compounds of the present invention are valuable central nervous system depressants of low toxicity of both the muscle relaxant and tranquilizer types and may be administered orally or parenterally. When so administered, they have been found to exhibit such activity in amounts ranging from 25 to about 350 mg. per kg. of body weight. The novel compounds of the present invention may be used as such but more preferably are used in the form of their non-toxic acid-addition salts which may be readily prepared by treatment with one equivalent of an acid such as hydrochloric, phosphoric, sulfuric, citric, etc.

The novel compounds of the present invention may be prepared in a variety of ways. The 17-oxoyohimban-18α-carbonitrile may be prepared by treating yohimbano [18,17-d]-isoxazole with a basic reagent such as, for example, an alkali metal alkoxide, sodium hydride, or mild aqueous alkali. This reaction is preferably carried out in a lower alkanol solvent at room temperature over a period of several hours. The 17-oxoyohimban-18α-carbonitrile may also be prepared by treating 18-hydroxymethyleneyohimban-17-one with O,N-bis(trifluoroacetyl)hydroxylamine. This reaction is preferably carried out in an inert solvent such as benzene at a temperature of 50°–100° C. over a period of time of from 15 minutes to several hours. Yohimbano[18,17-d]-isoxazole may be readily prepared by treating 18-hydroxymethyleneyohimban-17-one with hydroxylamine hydrochloride in a solvent such as glacial acetic acid at 100° C. for a few minutes. 18-hydroxymethyleneyohimban-17-one may be obtained in good yield by treating yohimban-17-one with a lower alkyl formate, such as methyl or ethyl formate, in the presence of a suitable base such as an alkali metal alkoxide, sodium hydride, sodamide, and the like. Yohimban-17-one has been described by Witkop, Ann., 554, 83 (1943).

The 17-oxoyohimban-18α-carbonitrile may be reduced to the corresponding 17-hydroxyyohimban-18α-carbonitriles by the use of a reducing agent such as an alkali metal borohydride, hydrogen and a catalyst, a metal and a base, etc. This reaction is preferably carried out in a lower alkanol solvent at room temperature over a period of several hours.

The 17-hydroxyyohimban-18α-carbonitriles may be hydrolyzed to the corresponding 17-hydroxyyohimban-18α-carboxylic acids by conventional hydrolysis with aqueous sodium hydroxide. The 17-hydroxyyohimban-18α-carboxylic acids may then be esterified by conventional methods such as by treatment with a diazoalkane, or treatment with a lower alkanol in the presence of a mineral acid, or treatment with a lower alkanol in the presence of N,N'-dicyclohexylcarbodiimide.

The 17-hydroxyyohimban-18α-carboxylate esters may also be prepared by the reduction of the corresponding 17-oxoyohimban-18α-carboxylate esters with a reducing agent such as an alkali metal borohydride, hydrogen and a catalyst, a metal and a base, etc. This reaction is preferably carried out in a lower alkanol solvent at room temperature over a period of several hours. The 17-oxoyohimban-18α-carboxylic acid may be readily prepared by treating yohimban-17-one with a lower alkyl metal carbonate such as methyl magnesium carbonate in an inert solvent such as dimethylformamide at 120°–130° C. for several hours. The so-prepared 17-oxoyohimban-18α-carboxylic acid may then be esterified by conventional methods such as by treatment with a diazoalkane, or treatment with a lower alkanol in the presence of a mineral acid, or treatment with a lower alkanol in the presence of N,N'-dicyclohexylcarbodiimide.

The invention will be described in greater detail in conjunction with the following specific examples.

*Example 1.—Preparation of 18-hydroxymethyleneyohimban-17-one*

To a cooled mixture of 10.0 g. of yohimban-17-one, 10.0 g. of sodium methoxide, and 300 ml. of sodium-dried benzene was added 14 ml. of ethyl formate. The mixture was stirred under nitrogen at room temperature for 20 hours and poured onto a mixture of 300 g. of ice and 200 ml. of water. The organic layer was separated and washed with three 100-ml. portions of 0.1 N sodium hydroxide. The basic washings and aqueous layer were combined and neutralized in the cold with acetic acid. Filtration afforded 9.4 g. of 18-hydroxymethyleneyohimban-17-one hemihydrate as tan crystals, M.P. 140°–147° C. On standing in the cold overnight, the mother liquor gave an additional 1.8 g. of crystals. Recrystallization from methanol afforded colorless needles, sintering to a glass at 145°–148° C., M.P. 207°–210° C. (dec.).

*Example 2.—Preparation of 18-hydroxymethyleneyohimban-17-one*

A mixture of 5.0 g. of yohimban-17-one, 5.0 g. of sodium methoxide, 150 ml. of dry peroxide-free dioxane, and 7 ml. of ethyl formate was stirred at room temperature under nitrogen for 21 hours. The mixture was neutralized with acetic acid and concentrated nearly to dryness. The residue was crystallized from aqueous methanol to yield 5.3 g. of 18-hydroxymethyleneyohimban-17-one hemihydrate as tan crystals, sintering to a glass at 145°–154° C., M.P. 207°–210° C. (dec.).

*Example 3.—Preparation of 17-oxoyohimban-18α-carbonitrile*

A suspension of 0.35 g. of 18-hydroxymethyleneyohimban-17-one in 10 ml. of benzene was partially distilled to remove moisture. To the resultnig suspension was added 0.161 ml. of dry pyridine, 0.34 g. of O,N-bis-(trifluoroacetyl)hydroxylamine, and 1 ml. of dry acetone and the resulting mixture was heated at 75°–80° C. by means of an oil bath for 2 hours. The solvent was removed under reduced pressure to give a dark brown gum which was partitioned between 6 ml. of saturated sodium bicarbonate and 5 ml. of chloroform. The aqueous layer was further washed with chloroform and the combined organic layers were dried over magnesium sulfate and evaporated. The resulting brown solid (0.227 g.) was crystallized successively from methanolchloroform, acetone-petroleum ether (B.P. 20°–40° C.) and methanol-water to give crystals of 17-oxoyohimban-18α-carbonitrile, M.P. 265–272° C. (dec.).

*Example 4.—Preparation of yohimbano[17,18-c]isoxazole and yohimbano[18,17-d]isoxazole hydrochlorides*

A mixture of 1.0 g. of 18-hydroxymethyleneyohimban-17-one, 0.225 g. of hydroxylamine hydrochloride and 15 ml. of glacial acetic acid was heated in an oil bath at 100° C. for 6 minutes. The mixture was cooled and filtered to give 0.43 g. of colorless needles. Recrystallization from aqueous methanol afforded 0.148 g. of a mixture of hydrochlorides of yohimbano[17,18-c]isoxazole and yohimbano[18,17-d]isoxazole as colorless needles, M.P. 310°–315° C. (dec.), containing one-fourth mole of water of crystallization.

*Example 5.—Preparation of 17-oxoyohimban-18α-carbonitrile*

A mixture of 0.36 g. of yohimbano[17,18-c]isoxazole and yohimbano[18,17-d]isoxazole was added to a solution of 0.115 g. of sodium in 10 ml. of ethanol. After standing overnight, the mixture was refluxed under nitrogen for 3 hours. The mixture was neutralized with acetic acid and diluted with water to give 0.281 g. of tan crystals, M.P. 263°–268° C. (dec.). Purification of a sample by chromatography over silica gel afforded 17-oxoyohimban-18α-carbonitrile containing one-fourth mole of water of crystallization as tan needles, M.P. 278°–280° C. (dec.).

*Example 6.—Preparation of 17α-hydroxyyohimban-18α-carbonitrile and 17β-hydroxyyohimban-18α-carbonitrile*

To a cooled solution of 0.35 g. of sodium borohydride in 50 ml. of ethanol was added 2.0 g. of 17-oxoyohimban-18α-carbonitrile. The mixture was stirred at room temperature for 4 hours. The excess sodium borohydride was decomposed with acetic acid and the solvent removed under reduced pressure. The residual pale yellow solid was partitioned between chloroform and water, and the chloroform-soluble product was chromatographed on alumina. Elution with chloroform: acetone (3:2) afforded 0.46 g. of a solid which when crystallized from aqueous methanol gave 0.135 g. of 17α-hydroxyyohimban-18α-carbonitrile, containing one-fourth mole of water of crystallization, as tan crystals, M.P. 260°–265° C. (dec.).

Further elution of the column with chloroform: methanol (99:1) afforded 0.534 g. of a solid which when crystallized from methanol gave 0.36 g. of 17β-hydroxyyohimban-18α-carbonitrile, containing one-fourth mole of water of crystallization, as white fluffy needles, M.P. 247°–250° C. (dec.).

*Example 7.—Preparation of 17α-hydroxyyohimban-18α-carboxylic acid and methyl 17α-hydroxyyohimban-18α-carboxylate*

A mixture of 0.10 g. of 17α-hydroxyyohimban-18α-carbonitrile, 4.0 ml. of ethanol, 1.0 ml. of water and 0.25 g. of sodium hydroxide was refluxed for 21 hours. The solvent was removed and the residue was dissolved in 5.0 ml. of water and neutralized with acetic acid. The solid was removed by filtration and washed with 3.0 ml. of water and dried. There was obtained 0.08 g. of crude 17α-hydroxyyohimban-18α-carboxylic acid. A second crop of acid (0.01 g.) was obtained from the mother liquors on standing. The combined crops of crude 17α-hydroxy-18α-carboxylic acid were suspended in methanol and treated with excess diazomethane in ether. Decomposition of the excess diazomethane with acetic acid and evaporation of the solvent under reduced pressure gave 0.092 g. of a glass. Chromatography of the glass over alumina with chloroform as the eluant afforded 0.012 g. of methyl 17α-hydroxyyohimban-18α-carboxylate, containing one mole of methanol of crystallization, as tan needles, M.P. 206–211° C. (dec.).

*Example 8.—Preparation of 17β-hydroxyyohimban-18α-carboxylic acid and methyl 17β-hydroxyyohimban-18α-carboxylate*

A mixture of 0.092 g. of 17β-hydroxyyohimban-18α-carbonitrile, 4.0 ml. of ethanol, 1.0 ml. of water and 0.22 g. of sodium hydroxide was refluxed for 18 hours. The mixture was concentrated to ca. 1.5 ml., and the solid which separated was dissolved by the addition of 4.0 ml. of water. The solution was neutralized with acetic acid and the solid which separated was removed by filtration and dried to yield 0.13 g. of crude 17β-hydroxyyohimban-18α-carboxylic acid. This was suspended in methanol and treated with excess diazomethane in ether. Decomposition of the excess diazomethane with acetic acid and concentration of the solution under reduced pressure afforded 0.13 g. of a brown glass. The glass was crystallized from aqueous methanol to give 0.03 g. of methyl 17β-hydroxyyohimban-18α-carboxylate, containing one-fourth mole of water of crystallization, as white crystals, M.P. 145°–148° C.

*Example 9.—Preparation of 17-oxoyohimban-18α-carboxylic acid hydrochloride*

A mixture of 2.0 g. of yohimban-17-one and 25 ml. of a solution (about 2 M) of methyl magnesium carbonate in dimethylformamide was stirred and heated at 120°–

130° C. for 3 hours under nitrogen. The mixture was cooled in an ice bath and added slowly to a stirred mixture of 50. g. of ice and 30 ml. of concentrated hydrochloric acid, which was cooled in an ice-salt bath. The solid which separated was filtered and washed with 2 ml. of cold 6 N hydrochloric acid. Drying over phosphorous pentoxide under vacuum at room temperature afforded 2.71 g. of tan crystals, M.P. 292°–294° C. (dec.) (when inserted in an oil bath preheated to 288° C.). A 1.91 g. portion of this solid was triturated with a mixture of 650 ml. of methanol and 600 ml. of ether and the suspension was filtered to yield 0.86 g. of 17-oxoyohimban-18α-carboxylic acid hydrochloride as white crystals, M.P. 314°–317° C. (dec.) (when inserted in an oil bath preheated to 310° C.).

*Example 10.—Preparation of 17-oxoyohimban-18α-carboxylic acid sulfate*

Yohimban-17-one (0.294 g.) was carboxylated with 4.0 ml. of a solution of methyl magnesium carbonate in dimethylformamide as described in Example 9. The cooled reaction mixture was added to a mixture of 12 g. of ice and 2 ml. of 98% sulfuric and the solid which separated was filtered and washed with water and one ml. of ethanol. Drying over phosphorus pentoxide under vacuum at room temperature for several hours afforded 0.364 g. of 17-oxoyohimban-18α-carboxylic acid sulfate as pale yellow crystals, M.P. 230°–260° C. (gas evolution at 260° C.).

*Example 11.—Preparation of methyl 17-oxoyohimban-18α-carboxylate*

To a suspension of 0.50 g. of 17-oxoyohimban-18α-carboxylic acid hydrochloride in 50 ml. of ice cold methanol was added 50 ml. of ice cold ether containing diazomethane (prepared from 4.0 g. of nitrosomethylurea and 8.0 ml. of 40% potassium hydroxide and dried over potassium hydroxide pellets). The mixture was allowed to stand at room temperature for 10 minutes and the excess diazomethane was decomposed by the dropwise addition of glacial acetic acid. The solvent was removed under vacuum to give 0.598 g. of a hygroscopic glass. The glass was dissolved in 15 ml. of boiling methanol and water was added dropwise until white crystals separated. Cooling and filtration gave 0.201 g. methyl 17-oxoyohimban-18α-carboxylate as white crystals, M.P. 186°*188° C. (dec.) (when inserted in an oil bath preheated to 180° C.). A second crop of crystals (0.0234 g.) was obtained by diluting the filtrate with water. Extraction of the filtrate with five 10-ml. portions of chloroform and evaporation of the extracts under vacuum gave a glass. This glass was dissolved in 2.0 ml. of methanol and the solution diluted with 1.0 ml. of water. Cooling and filtration afforded a third crop (0.102 g.) of crystals, M.P. 181°–183° C. (dec.) (when inserted in an oil bath preheated to 180° C.). The three crops were combined, dissolved in 45 ml. of methanol and the solution diluted with 3.0 ml. of water. Cooling and filtration gave 0.211 g. of methyl 17-oxoyohimban-18α-carboxylate as white crystals, M.P. 186°–188° C. (dec.) (when inserted in an oil bath preheated to 180° C.).

*Example 12.—Preparation of methyl 17-oxoyohimban-18α-carboxylate*

A mixture of 0.35 g. of 17-oxoyohimban-18α-carboxylic acid hydrochloride, 40 ml. of methanol and 10 ml. of methanol saturated with dry hydrogen chloride was refluxed for 4 hours. The solution was concentrated under vacuum to approximately 5 ml. and the residual solution was diluted with ether. Cooling and filtration gave 0.223 g. of white crystals which were washed with ether. A portion of the crystals (0.10 g.) was partitioned between 10 ml. of saturated sodium bicarbonate solution and 10 ml. of chloroform. The aqueous layer was extracted with an additional 10 ml. of chloroform. Evaporation of the combined chloroform extracts under vacuum gave 0.098 g. of a glass which was dissolved in 5 ml. of hot methanol and the solution diluted with water until crystals separated. Cooling and filtration gave 0.073 g. of white needles, M.P. 248°–255° C. (dec.) (when inserted in an oil bath preheated to 180° C.). This solid was identified as a mixture of yohimban-17-one and methyl 17-oxoyohimban-18α-carboxylate by infrared analysis. This mixture was separated into its components by chromatography on silica gel.

*Example 13.—Preparation of methyl 17-oxoyohimban-18α-carboxylate*

To an ice cold mixture of 10.0 g. of crude 17-oxoyohimban-18α-carboxylic acid hydrochloride and 100 ml. of dimethylformamide were added 100 ml. of methanol and 11.0 g. of N,N'-dicyclohexylcarbodiimide. The mixture was stirred at room temperature for 20 hours, treated with 10 ml. of water and 3 ml. of acetic acid and stirred for an additional hour. The precipitated solid was removed by filtration and the filtrate concentrated under vacuum to 100 ml. The residual solution was treated with 50 ml. of saturated sodium bicarbonate solution and extracted with four 50-ml. portions of chloroform. The extracts were washed with three 100-ml. portions of water, dried over sodium sulfate and concentrated under vacuum. The residue was warmed with 50% aqueous methanol and on cooling and filtering there was obtained 6.0 g. of methyl 17 - oxoyohimban - 18α-carboxylate contaminated with some yohimban-17-one and N,N'-dicyclohexylurea. Separation of the components was accomplished by chromatography over silica gel and recrystallization from aqueous methanol.

*Example 14.—Preparation of methyl 17α-hydroxyyohimban-18α-carboxylate and methyl 17β-hydroxyyohimban-18α-carboxylate*

To a cooled solution of 2.38 g. of sodium borohydride in 300 ml. of methanol was added 11.6 g. of methyl 17-oxoyohimban-18α-carboxylate over a period of 10 minutes. The mixture was stirred under nitrogen for 50 minutes at 0° C. The excess sodium borohydride was decomposed with acetic acid and the solvent removed under reduced pressure to give a yellow glass. The glass was partitioned between 100 ml. of chloroform and 100 ml. of 2.5% sodium bicarbonate solution. The chloroform layer was separated, washed with 100 ml. of 2.5% sodium bicarbonate solution, dried over magnesium sulfate, and concentrated under reduced pressure to a glass. The glass was chromatographed over 900 g. of neutral alumina. Elution with chloroform afforded 1.45 g. of solid which when crystallized from methanol gave 0.705 g. of 17α - hydroxyyohimban - 18α - carboxylate as off-white needles, M.P. 212°–216° C. (dec.).

Further elution of the column with chloroform: methanol (99:1) afforded 2.25 g. of solid which when crystallized from aqueous methanol gave 0.896 g. of methyl 17β - hydroxyyohimban-18α-carboxylate, containing one-fourth mole of water of crystallization, as white crystals, M.P. 136°–140° C.

*Example 15.—Preparation of methyl 17α-hydroxyyohimban-18α-carboxylate*

To a cooled solution of 5.0 g. of sodium borohydride in 300 ml. of methanol was added 10.0 g. of methyl 17α-oxoyohimban-18α-carboxylate in small portions over a period of 5 minutes. The mixture was cooled and stirred under nitrogen for 1.5 hours, carefully neutralized by the addition of acetic acid, and evaporated under reduced pressure. The residue was partitioned between chloroform and 2.5% sodium bicarbonate. The aqueous phase was washed with additional chloroform and the combined organic layers dried over magnesium sulfate and evaporated to produce 6.1 g. of a partly crystalline yellow solid. This mixture was resolved into its components by crystallization followed by chromatography over neutral alumina. Elution with chloroform and crystallization from methanol produced methyl 17α-hydroxyyohimban-18α-carboxylate, containing one mole of methanol of crystallization, as colorless needles, M.P. 210°–214° C. (dec.).

We claim:

1. A member selected from the group consisting of 17α-hydroxyyohimban-18α-carbonitrile and a pharmaceutically acceptable acid-addition salt thereof.

2. A member selected from the group consisting of 17β-hydroxyyohimban-18α-carbonitrile and a pharmaceutically acceptable acid-addition salt thereof.

References Cited by the Examiner

UNITED STATES PATENTS

| | | | |
|---|---|---|---|
| 2,809,199 | 10/57 | MacPhillamy | 260—286 |
| 2,969,367 | 1/61 | Janot et al. | 260—287 |
| 3,022,310 | 2/62 | Diassi | 260—287 |
| 3,076,811 | 2/63 | Bartlett | 260—288 |
| 3,121,721 | 2/64 | Albright et al. | 260—287 |

OTHER REFERENCES

Albright et al.: J. Org. Chem., vol. 28 (Jan. 1963), pages 38 and 41.

WALTER A. MODANCE, *Primary Examiner.*

NICHOLAS S. RIZZO, *Examiner.*